United States Patent [19]

Neumann et al.

[11] E Re. 28,924

[45] Reissued Aug. 10, 1976

[54] PLATE TYPE ICE MAKER

[75] Inventors: Charles G. Neumann, Palatine; Harvey R. Krueger, Dundee; Walter Panock, Addison, all of Ill.

[73] Assignee: Reynolds Products Inc., Schaumburg, Ill.

[22] Filed: Mar. 11, 1975

[21] Appl. No.: 557,410

Related U.S. Patent Documents

Reissue of:

[64] Patent No.: 3,803,869
Issued: Apr. 16, 1974
Appl. No.: 327,985
Filed: Jan. 30, 1973

[52] U.S. Cl. ..... 62/320; 62/354
[51] Int. Cl.[2] ..... F25C 1/14
[58] Field of Search ..... 62/354, 320, 71, 346

[56] References Cited

UNITED STATES PATENTS

| | | | |
|---|---|---|---|
| 1,963,842 | 6/1934 | Gay | 62/354 UX |
| 3,191,398 | 6/1965 | Rader | 62/364 X |
| 3,702,543 | 11/1972 | Lyman | 62/354 |

OTHER PUBLICATIONS

German Utility Model PA 769,337, Hoppe 10/28/64.

*Primary Examiner*—William E. Wayner
*Attorney, Agent, or Firm*—Shenier & O'Connor

[57] ABSTRACT

A plate type ice maker for forming chunks of hard ice in which a member provided with an ice-forming passage having a cutting edge at one end thereof is moved over a plane freezing surface to cause ice crystals scraped from the freezing surface by the cutting edge to be forced into the forming passage in which they are subjected to compressive forces sufficient to form a rod of hard ice which emerges from the other end of the passage and which engages a breaker surface which fractures the rod to form a hard piece of ice.

22 Claims, 8 Drawing Figures

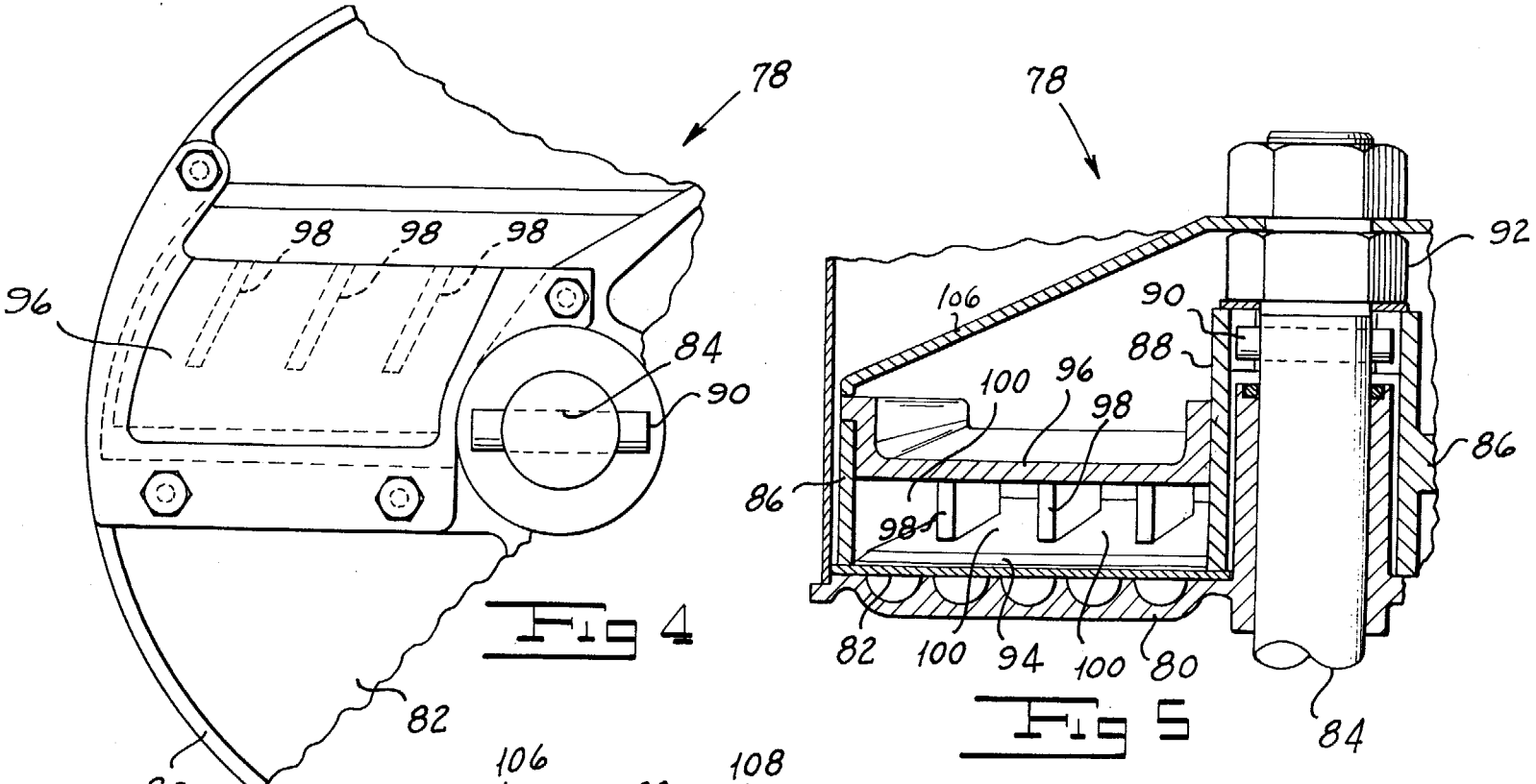
FIG. 5
FIG. 4
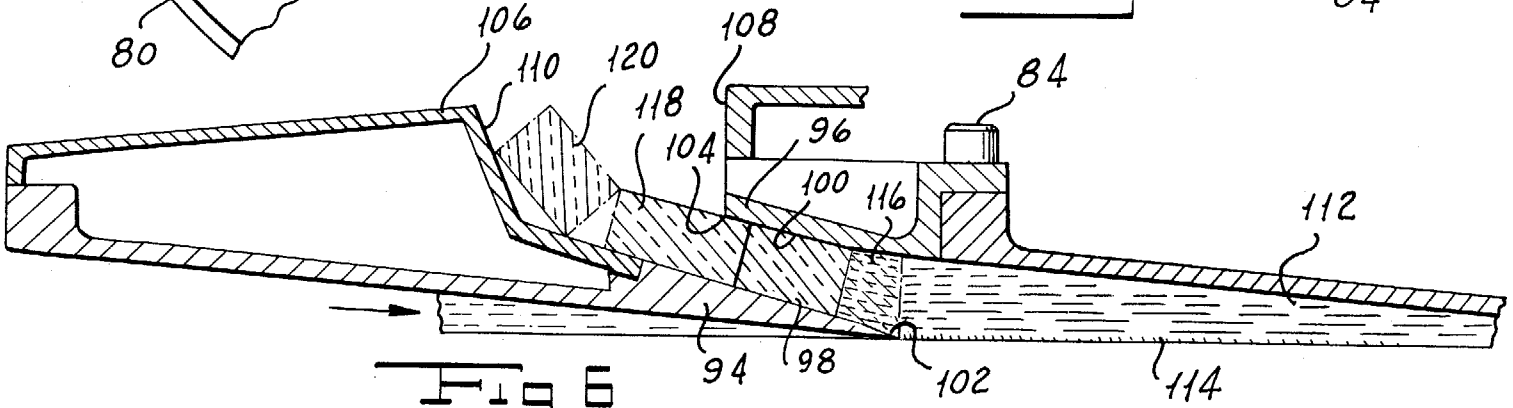
FIG. 6

PLATE TYPE ICE MAKER

Matter enclosed in heavy brackets [ ] appears in the original patent but forms no part of this reissue specification; matter printed in italics indicates the additions made by reissue.

BACKGROUND OF THE INVENTION

There are known in the prior art two general types of ice makers. The first of these which produces what is known in the art as flake or chip ice rather than hard ice includes an auger or the like which scrapes ice crystals from a tubular freezing surface and feeds the resultant slush ice outwardly through a die or the like to form flake or chip ice. Alternatively, a cylindrical freezing chamber can be employed and scraper blades on the outside of the chamber remove the ice crystals. In all ice makers of this type this chamber is vertical and of tubular or cylindrical shape. While ice makers of this type produce ice on a continuous basis, they embody the defect that the tubular evaporator configuration is mechanically weak and it requires various bearings and water seals. It is relatively costly to produce. In addition, the quality of ice produced on ice makers of this type is not consistent but is a function of the ambient temperature and the temperature of the incoming water and of the condition of the refrigerating equipment.

The other type ice maker known in the art is a "cube" ice maker in which water in a container is subjected to the action of a refrigerant. While some of the cube ice makers employ flat plate type evaporators, none of them produce ice on a continuous basis. That is to say, the freezing cycle is carried on until ice of the thickness of about one quarter to one half inch is formed and is then interrupted. Following interruption of the freezing cycle a harvest or defrost cycle is started. Thus, ice makers of this type do not produce ice on a continuous basis. While the ice is of high quality, the machine is extremely inefficient owing to the inherent insulating property of the ice itself. Stated otherwise, a relatively great refrigerating effort is required to produce ice of any appreciable thickness.

We have invented a plate type ice maker which overcomes the defects of ice makers of the prior art. Our plate type ice maker is adapted to produce chunks of hard ice on a continuous basis. It is more rugged than are auger type ice makers of the prior art. It is less expensive to manufacture than auger type ice makers. It is more efficient than are cube type ice makers of the prior art. It does not require the alternate freeze and harvest cycles of cube type ice makers of the prior art.

SUMMARY OF THE INVENTION

One object of our invention is to provide a plate type ice maker which overcomes the defects of ice makers of the prior art.

Another object of our invention is to provide a plate type ice maker which produces chunks of hard ice on a continuous basis.

A further object of our invention is to provide a plate type ice maker which is more rugged than are auger type ice makers of the prior art.

A still further object of our invention is to provide a plate type ice maker which is less expensive to produce than are auger type ice makers of the prior art.

Yet another object of our invention is to provide a plate type ice maker which is more efficient than are cube type ice makers of the prior art.

Yet another object of our invention is to provide a plate type ice maker for producing pieces of hard ice without the necessity for alternate freeze and harvest cycles.

Other and further objects of our invention will appear from the following description.

In general, our invention contemplates the provision of a plate type ice maker in which a cutting edge at the entrance to an ice-forming passage moves over a plane freezing surface to scrape crystals of ice from the surface and force them into the ice forming passage in which the slush ice is compressed to such a degree as to form a hard rod of ice which emerges from the passage and impinges on a breaker surface which fractures the rod thus to form pieces of hard ice.

BRIEF DESCRIPTION OF THE DRAWINGS

In the accompanying drawings which form part of the instant specification and which are to be read in conjunction therewith and in which like reference numerals are used to indicate like parts in the various views:

FIG. 3 is a sectional view of one of the ice rod forming units of the form of our plate type ice maker illustrated in FIGS. 1 and 2.

FIG. 4 is a fragmentary top plan view of an alternate embodiment of our plate type ice maker with parts removed.

FIG. 6 is a section view taken along a diametral chord of the form of our ice maker shown in FIGS. 4 and 5 to illustrate the mode of operation thereof.

DESCRIPTION OF THE PREFERRED EMBODIMENT

Figure 1:
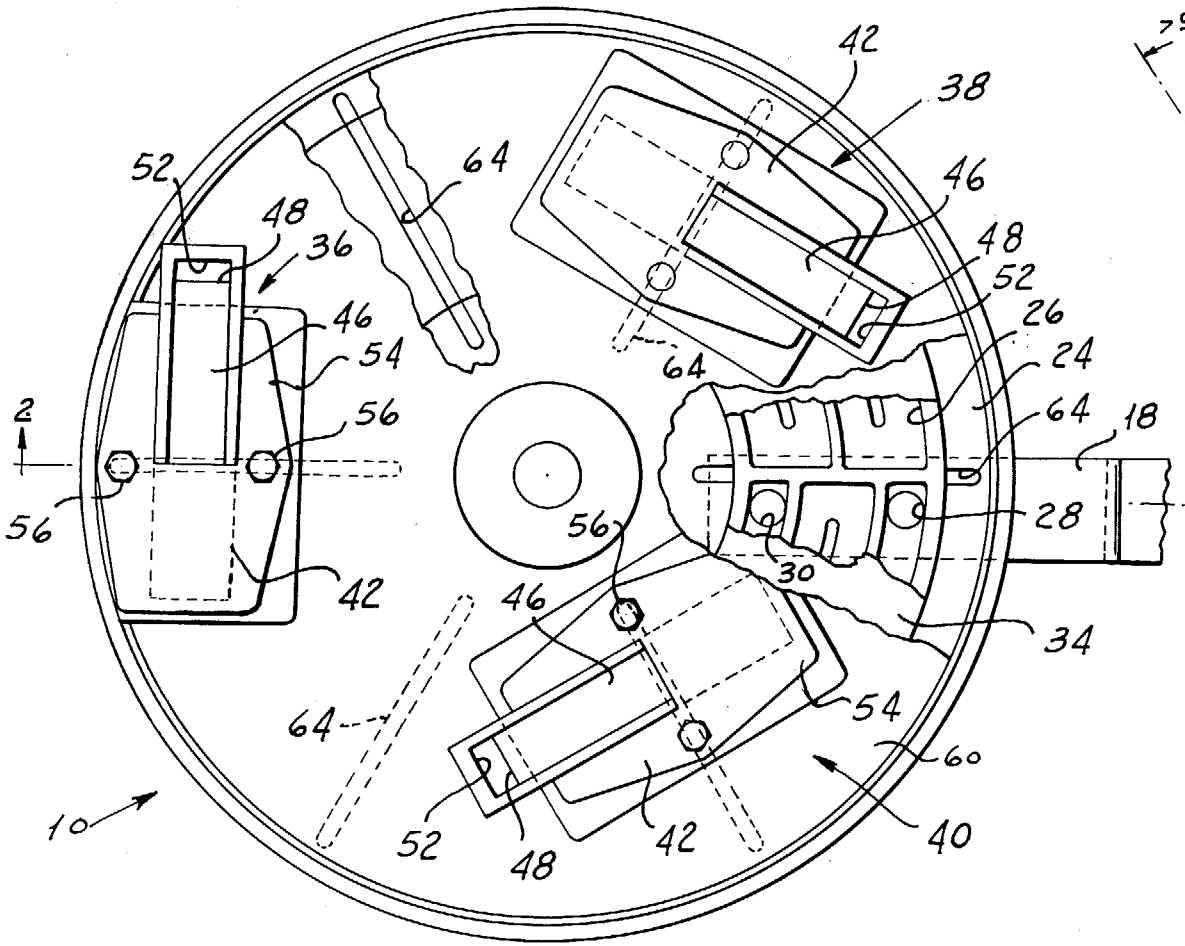
FIG. 1 is a top plan view of one form of our plate type ice maker with parts removed and with other parts broken away.
Figure 2:
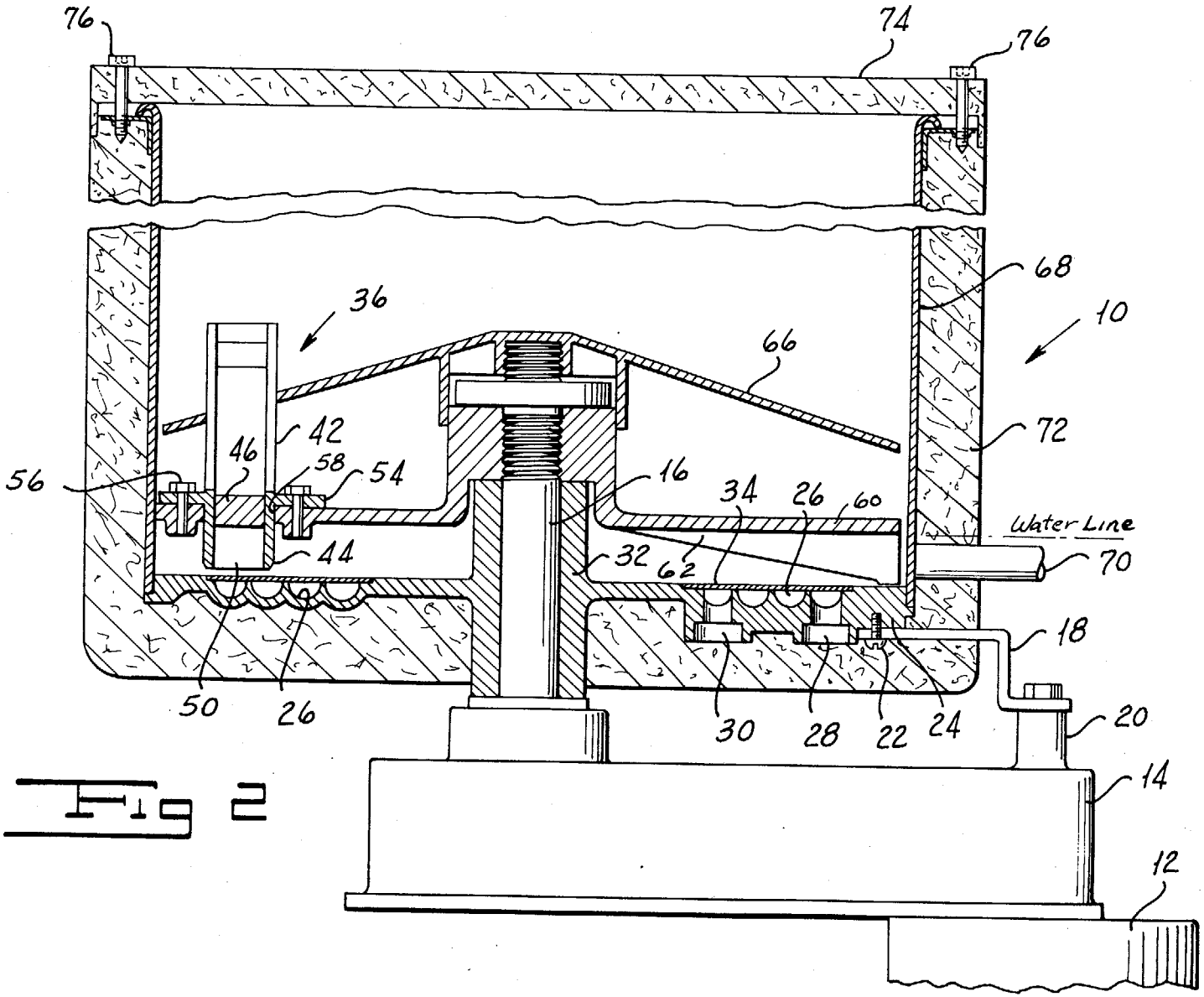
FIG. 2 is a sectional view of the form of our plate type ice maker shown in FIG. 1 taken along the line 2—2 of FIG. 1.

Referring now to FIGS. 1 to 3, one form of our plate type ice maker indicated generally by the reference character 10, includes a motor 12, which provides the input to a gear box 14 having an output shaft 16. A bracket 18 secured to a boss 20 on the gear box 14 is attached by means of a screw 22 or the like to an evaporator plate 24. We form the upper surface of the evaporator plate 24 with a plurality of coil-forming channels 26. Refrigerant may be introduced into the channels 26 through an inlet 28. A return outlet 30 permits the refrigerant to pass back to the compressor (not shown).

Shaft 16 extends upwardly through a hollow hub 32 on the evaporator plate 24. The arrangement is such that shaft 16 can rotate in the hub 32. An annular freezer plate 34 is secured over the channels 26 by any suitable means known to the art. Refrigerant flowing through the channels 26 cools the plate 34 to permit ice crystals to form thereon in a manner to be described.

The form of our ice maker 10 shown in FIGS. 1 to 3 includes three cube or ice piece-forming units indicated generally respectively by the reference characters 36, 38 and 40. Since all of the units 36, 38 and 40 are substantially identical we will describe only the unit 36 in detail. The unit 36 includes a chute-forming member 42 provided with an ice chute 44 which, together with a roof or top member 46, forms a channel for the reception of slush ice. The roof member may be secured to the channel-forming member 42 in any suitable manner. It includes a resilient tip portion 48 adapted to move to the broken line position illustrated in FIG. 3 in response to movement of a rod of ice up the passage. The member 42 further is formed with a scraper edge 50 adapted to scrape ice crystals from the surface of the plate 34. The leading edge of a rod of ice emerging from chute 44 passes under the tip 48, forcing it to the broken line position and ultimately engages a breaker surface 52 located in a plane forming an angle of less than 90° with the plane of the chute base and a piece of ice breaks off the rod. The length L of the piece is approximately equal to the distance between surface 52 and the end of tip 48, as indicated in FIG. 3.

Member 42 is formed with a peripheral flange 54 adapted to receive screws 56 to secure the member 42 in an opening 58 in a support plate 60 threaded onto shaft 16 for rotation therewith. We provide the plate 60 with a number of reinforcing ribs 62.

It is to be noted that the respective units 36, 38 and 40 are radially staggered as indicated in FIG. 1. That is, unit 36 is radially positioned so that its edge 50 rides over the outermost portion of the surface of the plate 34. Unit 38 is so positioned that its edge 50 rides over the central portion of the annular plate 34. Unit 40 is furthest inboard so that its edge 50 rides over the innermost portion of the plate 34. If desired, we may provide some overlap between the edges 50 of the various units. We provide the surface of the plate 34 with spaced radially extending grooves 64 for preventing a body of ice from moving along with the rotating support plate 60 when shaft 16 is driven.

We mount a cover plate 66 on the plate 60 for rotation therewith. As chunks of ice are formed in the various units in a manner to be described they are discharged at locations above the plate 66 so as to be retained thereon. Any water running off the formed ice passes downwardly over the edge of the plate 66. We mount a surrounding wall 68 on the outer edge of plate 24 to provide a storage space for formed ice. The entire assembly is provided with an insulating jacket 72. An inlet pipe 70 permits water to be introduced into the space over the freezer plate 34. Preferably, we maintain the water at a level indicated by the dot-dash line in FIG. 2. A cover 74 is adapted to be removably secured over the top of the wall 68 by any suitable means such for example as by screws 76.

Figure 5:
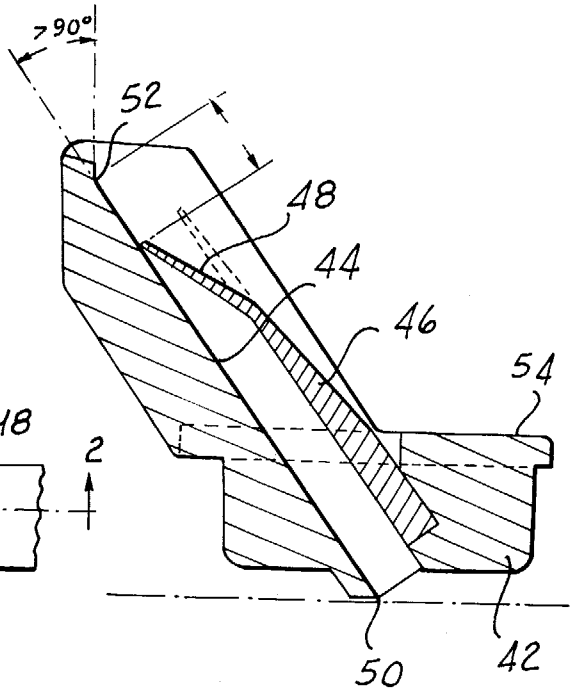
FIG. 5 is a sectional view of the embodiment of our ice maker illustrated in FIG. 4.

Referring now to FIGS. 4 to 6, an alternate embodiment of our plate type ice maker indicated generally by the reference character 78 includes an evaporator plate 80 covered with a plate 82 providing the freezing surface. The output shaft 84 of a gear box or the like passes upwardly through the central hollow hub of the plate 80 and is secured to an extruding head support 86 by means of a key 90 or the like the ends of which engage recesses in the hub 88 of the support plate 86. A nut 92 threaded onto shaft 84 is adapted to position the support 86 on the shaft.

The support 86 carries a scraper blade 94 adapted to move over the surface 82 when the support member 86 is driven by shaft 84. It will be appreciated that the blade 94 may include more than one scraping edge, such for example as a second edge at a location circumferentially spaced around hub 88 from the edge shown in the drawings.

We mount a respective extruder ad 96 over each of the scraping edges of the blade 94. The member 86 includes downwardly extending partitions 98 which, together with the upper surface of the scraping blade 94 provide extruding passages for the formation of ice. It will be seen that the space between the outer wall portion of support 86 and the hub 88 and between the top of head 96 and the cutting edge of blade 94 forms a plenum chamber just ahead of passages 100 in the direction of movement of the head 96. Ice being scraped from plate 82 collects in the plenum chamber and is partially dewatered in the course of its passage therethrough. Finally it is forced into passages 100 wherein it is [ extended ] *extruded* to form hard ice.

Each of the passages 100 has an outlet 104 leading into a recess formed in the top of a drip ring 106 secured to shaft 84 for rotation therewith. Each recess 108 is provided with a surface 110 on which a rod of ice emerging from the outlet 104 impinges. In FIG. 6 we have indicated water by the reference character 112, the thin film of ice on the surface of plate 82 by 114, slush ice in the plenum chamber by the reference character 116, the rod of ice by 118, and a broken off ice piece by 120.

Figure 7:
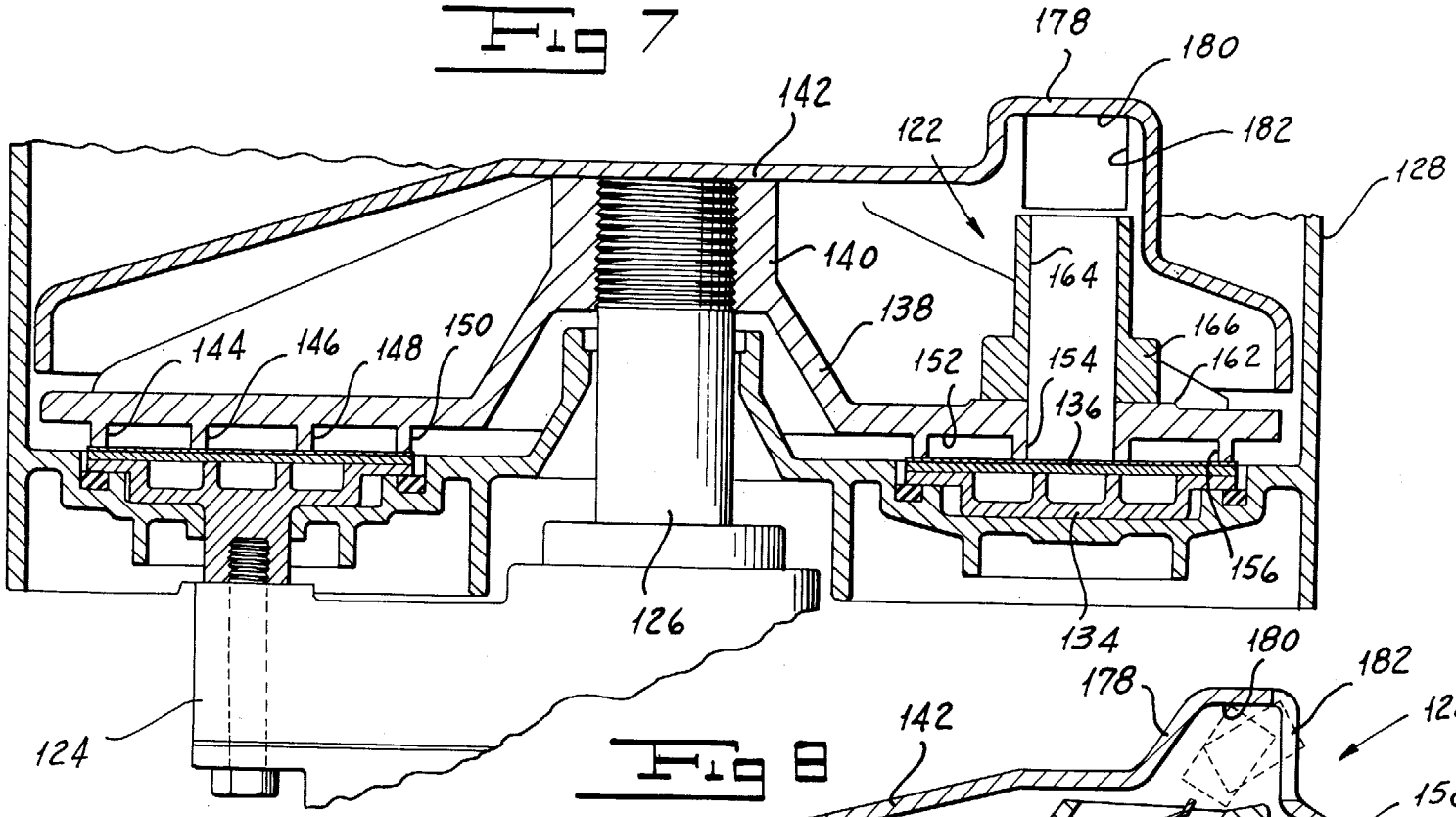
FIG. 7 is a fragmentary sectional view of a further form of our plate type ice maker.
Figure 8:
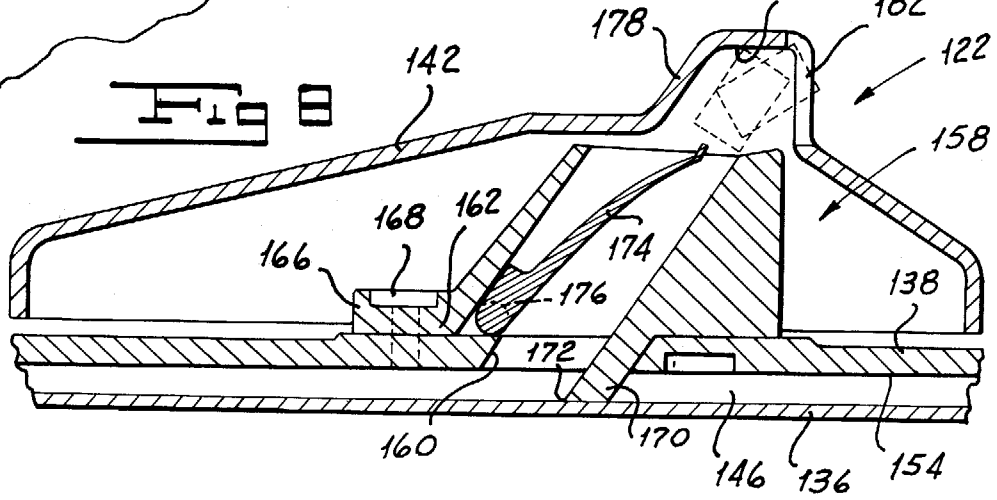
FIG. 8 is a fragmentary sectional view of the form of our plate type ice maker shown in FIG. 7 and taken along the path of movement of a cutter thereof to illustrate the operations thereof.

Referring now to FIGS. 7 and 8, we have illustrated yet another form of our plate type ice maker, indicated generally by the reference character 122. The ice maker 122 includes a gear motor 124 having an output shaft 126. A stationary housing 128 formed with a base 130 is secured to the gear motor housing by any suitable means such, for example, as by screws 132. A refrigerant coil-forming member 134 supported on the base 130 carries a freezer plate 136 on the surface of which ice crystals form when water is supplied to the plate and when refrigerant flows in the coil-forming assembly 134.

The ice maker 122 includes a cutter disc 138 formed with a hub 140 which is screwed onto or otherwise secured to the shaft 126 for rotation therewith. We provide a cover plate 142 secured to hub 140 in any suitable manner so as to be driven together with the cutter disc 138.

The salient feature of the form of our plate type ice maker illustrated in FIGS. 7 and 8 is a plurality of circumferentially extending radially spaced ribs or walls 144, 146, 148 and 150 on the bottom of the cutter plate 138. Pairs of adjacent ribs 144 and 146, 146 and 148, and 148 and 150 provide confined passages 152, 154 and 156 for ice removed from the surface of plate 136 in a manner to be described.

Our ice maker 122 includes a plurality of ice rod-forming assemblies indicated generally by the reference character 158. While we have illustrated only one assembly 158 in FIGS. 7 and 8, it will readily be appreciated from the description hereinbelow that we provide three such assemblies, one for each of the channels 152, 154 and 156. Each of these channels is provided with a respective opening 160 surrounded by a boss 162 for receiving an assembly 158. Each assembly 158 is formed with an inclined passage 164 and with a base 166 secured to a boss 162 by any suitable means such, for example, as by screws 168. An extension 170 on the trailing wall of the inclined passage 164 extends downwardly through the opening 160 and to a location at which a scraper edge 172 thereon cooperates with the portion of the freezer plate 136 associated with the channel 154 for example.

Each assembly 158 includes a spring finger 174 analogous to the finger 46 of the form of our invention illustrated in FIGS. 1 to 3. In the form of our ice cube maker illustrated in FIGS. 7 and 8 however, the fingers 174 are provided with pivotal supports 176 which mount the fingers on the assemblies 158. As ice is scraped off the surface of the plate 136 by the scraper edge 172, it builds up in the channel 154 and forces its way up the inclined passage 164 so as ultimately to engage the finger 174. Upon continued rotation of the scraper plate 138, the action of the finger 174 compresses the slush ice until ultimately a rod of ice emerges from the upper end of the inclined passage 164.

We form the cover 142 with a respective prominence or boss 178 over each of the assemblies 158. The underside of the top of each boss 178 provides a breaker surface 180. As the rod moves upwardly out of the passage 164 its upper edge engages the surface 180 so that a cube of ice is broken off the upper end of the rod. It will readily be appreciated that the length of the cube or piece of ice broken off is determined by the distance between the upper end of the trailing edge of the passage 164 and the surface 180. Pieces of ice thus broken off the upper end of the rod outwardly of the cover 142 through openings 182 in the bosses. This ice accumulates within the housing 128 over the cover 142. It will be seen that any melt-down from the accumulated ice flows downwardly over the edges of the cover and back toward the freezer plate 136.

In operation of the form of our invention illustrated in FIGS. 1 to 3, water is introduced into the space over the surface of plate 34 through line 70. A thin film of ice forms on top of the plate 34. As shaft 16 rotates, the respective scraper or cutter edges 50 of the units 36, 38 and 40 traverse different portions of the upper surface of the plate 34 and scrape or cut ice from the film of ice as slush ice. The radial grooves 64 prevent any body of ice being moved along with the rotating units 36, 38 and 40. It will be appreciated that as a cutting edge 50 removes ice from the film formed on the surface of plate 34, a diametral track in line with the cutter is formed in the film of ice. Thus, the cut ice is contained within this track and is immediately forced up the inclined plane formed by the bottom of chute 44. Owing to the fact that such a diametral track is formed, all ice is ultimately forced up the chute. In this manner, the slush ice is raised above the water level maintained in the freezing chamber. As more ice is forced up the chute, water is removed therefrom by elevating it above the water level. Ultimately the ice is forced against the spring tip 48 of the roof or top 46 of the chute 44. The pressure exerted by this closure forces additional water out of the ice until sufficient force is exerted by the rod of ice on the tip 48 to force it to the broken line position shown in FIG. 3. By this time, the ice emerging from the top of the chute is hard bar ice. Finally this bar of ice impinges on the surface 52 which is at an angle of less than 90° to the bottom of the chute. Owing to the fact that the ice is brittle, it will fracture at the end of the tip 48 in its broken line position to form a chunk of ice. The thus formed chunks of ice collect on top of the cover 66 so as to provide a supply of hard chunks of ice.

It is to be noted that in the form of our invention shown in FIGS. 1 to 3 radial and thrust loads of the cutters are applied directly to the bearings of the gear motor output shaft. Moreover, since the three cutter edges are displaced from one another by 120° the leads and forces developed by the edges are relatively evenly distributed. The evaporator plate is mounted on the output shaft 16 so as to eliminate the possibility of misalignment between the freezing surface and the cutting edges 50. Our arrangement eliminates the necessity for providing water seals and shaft bearings such as cause problems with auger type ice makers of the prior art.

In operation of the form of our ice maker shown in FIGS. 4 to 6, the cutting edges of the blade 94 scrape slush ice off the film of ice 114 formed on the upper surface of plate 82 from the water 112. This slush ice is forced into the plenum chamber leading into the passages 100, in the course of movement through which it is extruded into the hard rod 118. Ultimately the leading edge of the rod strikes surface 110 to break the rod into chunks of ice. The amount of compression exerted on the slush ice is determined not by the lead of an auger, as in auger type ice makers of the prior art, but rather by the quantity of ice collected in the plenum chamber. The quantity of ice thus collected is dependent upon the velocity of the cutter and the refrigeration conditions of the freezing surface. The quality of the extruded ice does not change. It requires only more or less revolutions of the device to produce ice of a given length and size.

In operation of the form of our invention illustrated in FIGS. 7 and 8, the scraper edges 172 of the respective units 158 scrape ice crystals off the surface of plate 136. In this form of our invention, the walls or ribs 144, 146, 148 and 150 form confined channels extending circumferentially of the plate 136 and in line with the cutting edges 172 and the entries of the inclined passages 164 of the units 158. These passages ensure that ice scraped from the surface of plate 136 will enter the passages 164. As this ice is formed upwardly along the inclined passages 164, a rod of hard ice is formed in a manner similar to that in the operation of the form of our invention illustrated in FIGS. 1 to 3. As a rod of ice emerges from the top of the inclined passage 164, it strikes the breaker surface 180 so that pieces of hard ice break off and are discharged outwardly through outlets 182 to the storage area in housing 128 above the cover 142.

It will be seen that we have accomplished the objects of our invention. We have provided a plate type ice maker which overcomes the defects of ice makers of the prior art. Our ice maker is adapted to make hard chunks of ice on a continuous basis. It does not require alternate freezing and harvest cycles. It is more efficient than are cube type ice makers of the prior art. It is more rugged and is less expensive to construct than are auger type ice makers of the prior art.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for forming hard pieces of ice including in combination, means forming an extended freezing surface, means forming an extruding passage having an entry and an exit *and a bottom extending upwardly and away from said surface*, a gathering edge *provided on said passage forming means for movement therewith* adjacent to said entry, and means mounting said passage forming means for movement relative to said surface with said gathering edge adjacent to said surface to remove ice crystals from a film of ice on said surface and to deliver said ice crystals to said entry in the form of slush ice, *said passage forming means being provided with means for exerting a compressive force on slush ice delivered thereto so that slush ice* which enters said passage [ and ] emerges from said exit in the form of a hard rod of ice in response to relative movement between said passage forming means and said surface.

2. Apparatus as in claim 1 in which said surface is generally horizontal and in which said passage forming means is mounted above said surface.

3. Apparatus as in claim 2 including means for supplying water to a predetermined level over said surface and in which said passage exit is above said level.

4. Apparatus as in claim 3 in which said passage forms an inclined plane with reference to said surface from said entry to said exit.

5. Apparatus as in claim 4 including means for breaking said rod emerging from said exit.

6. Apparatus as in claim 5 [ including ] *in which said compressive force exerting means includes* means forming a plenum chamber between said gathering edge and said entry.

7. Apparatus as in claim 5 [ including ] *in which said compressive force exerting means includes* resilient means normally closing said exit, said resilient means adapted to be actuated by the ice emerging from said passage.

8. Apparatus as in claim 5 in which said breaker means comprises a surface making an angle of less than 90° with said inclined plane.

9. Apparatus for forming hard pieces of ice including in combination, means providing an extended ice forming surface, means forming an extrusion passage having an entry and an exit *and a bottom extending upwardly and away from said surface*, said passage forming means being provided with a gathering edge adjacent to said entry, means mounting said surface forming means and said passage forming means for relative rotary movement with said passage above said surface and with said gathering edge adjacent to said surface and with said exit above said entry, and means for driving said passage forming means and said surface forming means relative to each other to cause said gathering edge to remove ice from said ice-forming surface and to feed slush ice into said passage, *said passage forming means being provided with means for exerting a compressive force on slush ice fed thereto* to form a mass of hard ice emerging from said exit.

10. Apparatus as in claim 9 including means for breaking said mass of ice emerging from said exit.

11. Apparatus as in claim 10 in which said breaking means comprises a surface disposed at an angle to the direction of movement of said mass.

12. Apparatus as in claim 11 [ including ] *in which said compressive force exerting means include* resilient means normally closing said exit. [ , said resilient means exerting a compressive force on ice moving into said passage under the influence of said relative movement ]

13. Apparatus as in claim 9 [ including ] *in which said compressive force exerting means includes* resilient means normally closing said exit [ , said resilient means exerting a compressive force on ice moving into said passage under the influence of said relative movement ] , said resilient means being actuated to open said exit in response to movement of a mass of hard ice toward said exit.

14. Apparatus as in claim 13 in which said resilient means is a leaf spring forming part of the wall of said passage.

15. Apparatus as in claim 14 including means forming a breaker surface making an angle with the direction of movement of said rod, said surface being spaced from said exit.

16. Apparatus as in claim 9 in which sad passage forming means forms a plurality of radially spaced passages.

17. Apparatus as in claim 16 in which said [ passage forming means provide ] *compressive force exerting means comprises* a common plenum chamber *formed by said passage forming means* between said gathering edge and the passage entries.

18. Apparatus as in claim 9 including a plurality of passage forming means, said passage forming means being radially and circumferentially spaced with reference to the axis of rotary movement thereof.

19. Apparatus for forming hard pieces of ice including in combination means providing a generally horizontally disposed annular extended ice forming surface, a plurality of hard ice forming units, each of said hard ice forming units having an inclined extruding passage therein extending from an entry to an exit, each of said units having a cutting edge adjacent to said entry, each of said units having resilient means normally closing said exit and having an ice breaker surface spaced from said exit and making an acute angle with the direction of inclination of said passage, means mounting said units at respective locations circumferentially spaced and radially spaced with respect to the center of said annulus for relative rotary movement of said units and said surface providing means around said center and with said cutting edges closely adjacent to said surface and means for driving said surface providing means and said mounting means relative to each other to cause said cutting edges to remove said ice from said surface and to feed slush ice into said passage entries to cause rods of ice to form in said passages and to cause said rods to actuate said resilient means to open said passage exit and to impinge on said breaker surfaces to provide said pieces of hard clear ice.

20. Apparatus as in claim 19 including means for supplying water to a predetermined level over said surface, said exits being positioned above said level.

21. Apparatus as in claim 9 in which said mounting means comprises means forming an elongated ice confining channel above and extending generally parallel to said ice forming surface, said passage opening into said channel.

22. Apparatus as in claim 19 in which said unit mounting means comprises means forming a plurality of radially spaced circumferentially extending channels over said ice forming surface, said extruding passage extending into respective channels.

* * * * *